US012560069B2

(12) United States Patent
Zhang et al.

(10) Patent No.: US 12,560,069 B2
(45) Date of Patent: Feb. 24, 2026

(54) AUTOMATIC HISTORY MATCHING SYSTEM AND METHOD FOR AN OIL RESERVOIR BASED ON TRANSFER LEARNING

(71) Applicant: China University Of Petroleum (East China), Dongying (CN)

(72) Inventors: Kai Zhang, Dongying (CN); Jun Yao, Dongying (CN); Guoxin Li, Dongying (CN); Xia Yan, Dongying (CN); Bingxuan Liu, Dongying (CN); Junrong Liu, Dongying (CN); Wei Wang, Dongying (CN); Hui Zhao, Dongying (CN); Chuanjin Yao, Dongying (CN); Yanlai Li, Dongying (CN); Zhiwei Wang, Dongying (CN); Ji Qi, Dongying (CN); Xiaopeng Ma, Dongying (CN); Yunqi Jiang, Dongying (CN)

(73) Assignee: China University Of Petroleum (East China), Dongying (CN)

( * ) Notice: Subject to any disclaimer, the term of this patent is extended or adjusted under 35 U.S.C. 154(b) by 1055 days.

(21) Appl. No.: 17/540,861

(22) Filed: Dec. 2, 2021

(65) Prior Publication Data

US 2022/0341306 A1     Oct. 27, 2022

(30) Foreign Application Priority Data

Apr. 26, 2021    (CN) .......................... 202110454602.4

(51) Int. Cl.
G06F 17/11 (2006.01)
E21B 43/30 (2006.01)
G01V 20/00 (2024.01)

(52) U.S. Cl.
CPC .............. E21B 43/30 (2013.01); G01V 20/00 (2024.01); G06F 17/11 (2013.01); *E21B 2200/20* (2020.05)

(58) Field of Classification Search
CPC ...... E21B 43/30; E21B 2200/20; E21B 43/00; G01V 20/00; G06F 17/11; G06F 30/20; G06F 2111/10; G06Q 10/04
See application file for complete search history.

(56) References Cited

U.S. PATENT DOCUMENTS

2016/0239591 A1 * 8/2016 Sampath ................. G06F 30/23
2023/0273180 A1 * 8/2023 Torres-Verdin .... G01N 33/2823
                                                       73/152.18

OTHER PUBLICATIONS

Udy et al. Review of Field Development Optimization of Waterflooding, EOR, and Well Placement Focusing on History Matching and Optimization Algorithms Processes 2017, 5, 34 (Year: 2017).*

(Continued)

*Primary Examiner* — Rehana Perveen
*Assistant Examiner* — Cuong V Luu
(74) *Attorney, Agent, or Firm* — Nitin Kaushik

(57) ABSTRACT

The present invention relates to an automatic history matching system for an oil reservoir based on transfer learning, comprising a data reading module, a population reinitializing module, an optimization module, a simulated calculation module, a comparative judgment module and an output module, wherein the data reading module reads an optimized result of an existing oil reservoir, outputs the optimized result to the population reinitializing module, obtains an initial population of a new oil reservoir by calculation and outputs the initial population to the optimization module.

5 Claims, 7 Drawing Sheets

(56) References Cited

OTHER PUBLICATIONS

Calvet et al. Learnheuristics: hybridizing metaheuristics with machine learning for optimization with dynamic inputs Open Mathematics, 2017; 15: pp. 261-280 (Year: 2017).*

* cited by examiner

AUTOMATIC HISTORY MATCHING SYSTEM AND METHOD FOR AN OIL RESERVOIR BASED ON TRANSFER LEARNING

TECHNICAL FIELD

The present invention belongs to the field of petroleum engineering, in particular relates to an automatic history matching system and method for an oil reservoir based on transfer learning.

BACKGROUND

In reservoir numerical simulation, in order to make an oil reservoir model accord with a true condition of the oil reservoir accurately to the greatest extent, a history matching method is usually adopted, and the model is corrected by using oil reservoir data. The method comprises the specific steps of: calculating main dynamic indexes (such as pressure, gas-oil rate, production and water cut) in an oil reservoir development process by using a static parameter of a stratum first; and if the calculated result is greatly different from a true condition, modifying the static parameter of an oil reservoir continuously till a permitted error range is reached between the actually measured dynamic index and calculated result. At the moment, it is considered to have a quite precise result by using the model for dynamic prediction. It is necessary for a conventional history matching method to adjust massive parameters of the model tediously and meticulously and readjust and operate by performing comparison after calculating the result, so that the workload is extremely great and the efficiency is extremely low. The current automatic history matching method adjusts a static parameter of the stratum in the model automatically by adopting an optimization algorithm, so that the matching efficiency and the matching precision is improved. Thus, it is an urgent need to apply history matching of an oil reservoir more widely by studying an efficient automatic history matching method. In solving a history matching problem, common methods primarily comprise gradient methods and gradient-free methods. Primary gradient methods comprise a Newton method, a finite storage method and the like, the gradient-free methods comprise an Ensemble Kalman Filter, and an approximate gradient method comprises a stochastic perturbation gradient approximation method and the like.

However, there are some shortcomings in such methods. For example, it is necessary for the Newton method to store and calculate a Hessian matrix, so that this method is not suitable for solving automatic history matching problem in large oil reservoir simulation. Although the finite storage method is of certain superiority in processing the automatic history matching problem, there is a great limitation as this method fails to being universal to oil reservoir numerical simulators. When applied to solving history matching problems of the oil reservoir of relatively large scales, random algorithms cannot gain satisfactory calculating efficiency and precision.

The history matching problems of the oil reservoir are not a group of independent static optimization problems, but a dynamic problem with relatively small change, i.e., a time sequence problem. The time sequence can be divided into moments 1, 2, 3, . . . , (t−1), t, (t+1) and so on according to actual conditions. Change of each moment represents changes of the oil reservoir or addition of new data into the oil reservoir model, and it is necessary to adjust the history matching model. Thus, it can be seen from that the model of new moment is obtained by modifying the model of the old moment. A calculating workload needed to search for a solution for a new example can be reduced remarkably by properly utilizing useful information in the old model optimization process.

In recent years, it has advantages in using experience of old problem as reference by applying a transfer learning technique that is increasingly extensive, and its main thought lies in transfer of annotated data or knowledge mechanisms in related field to finish or improve the learning effect in a targeted field or task. In view of history matching problems, the model can be matched efficiently and accurately by utilizing experience of existing model and annotated data. Thus, a new opportunity is brought to predict the oil reservoir dynamically as the transfer learning technique is utilized to improve history matching technique of the oil reservoir.

SUMMARY

In order to overcome shortcomings in the prior art, the present invention aims to provide an automatic history matching system and method for an oil reservoir based on transfer learning. By adopting a reinitializing policy with directivity and random change based on transfer learning, experience of adjusting a history matching model in an old optimized example is transferred, so that the dynamic history matching optimization problem of a new optimized example is solved.

In order to achieve the objective and solve the above problems, the present invention adopts the following technical solution:

An automatic history matching system for an oil reservoir based on transfer learning comprises a data reading module, a population reinitializing module, an optimization module, a simulated calculation module, a comparative judgment module and an output module, wherein the data reading module reads an optimized result of an existing oil reservoir, outputs the optimized result to the population reinitializing module, obtains an initial population of a new oil reservoir by calculation and outputs the initial population to the optimization module; the optimized result is outputted to the simulated calculation module to obtain oil reservoir production simulated data, and the oil reservoir production simulated data is outputted to the comparative judgment module; when an error between the simulated data and observed data meets the requirement, the optimized result is outputted to the output module, and the system operation is completed; and if the error does not meet the requirement, a simulated result is outputted to the optimization module, and optimized calculation of the optimization module, the simulated calculation module and the comparative judging module is performed again.

Compared with the prior art, the present invention has the following benefits:

1. Matching experience of existing model may be used for reference: parameters of the old oil reservoir model are read, recorded and learned by adopting a history matching method based on transfer learning, optimized experience thereof is extracted by a mathematic method, and the experience is reused in optimized calculation of the oil reservoir model of the new example. Specifically, by using experience of adjusting the history matching model in the oil reservoir model of the old example for reference, when observed data such as liquid production changes, the experience of the historical model that adjusts the static parameter of the model such as permeability realizes fast and accurate construction of the history matching model of the oil reservoir in the new example, so that the prediction efficiency and precision are improved.

2. The initial population closer to the optimized result may be constructed according to the matching experience of the existing model: according to similarities of a same oil reservoir at different moments or of similar oil reservoir, the finished population is optimized by using the old example, i.e., the parameter of the example model, and the initial population of the oil reservoir model of the new example is constructed fast through processing by the reinitializing policy based on transfer learning. Compared with a conventional method of constructing the initial population randomly, a lot of calculation of the initial population is saved randomly, the complexity and nondeterminacy of calculation are reduced, the search space of the optimized parameter is reduced, the number of iterations and calculating time are reduced, mapping of knowledge of the old case to a new case is realized, and the accuracy and reliability of the history matching model are improved.

3. It may be integrated with any evolutionary optimization algorithm. As the reinitializing policy based on transfer learning is a frame that reads historical data and processes the same, it may be integrated with any evolutionary optimization algorithm, and therefore, the optimum optimization algorithm can be selected for the specific history matching problem of the oil reservoir, malpractices of various optimization algorithms in the actual problems are reduced, the parameters of the oil reservoir model are adjusted automatically, the matching time is shortened, the matching precision is improved and the calculating efficiency and accuracy are improved. In addition, by separating influence of the reinitializing policy from the whole algorithm, the algorithm may be tested and adjusted fast.

4. The algorithm has better performance to an optimization task in actual engineering problems, which is more suitable for being applied to the actual engineering problems.

DETAILED DESCRIPTION OF THE EMBODIMENTS

Figure 1:
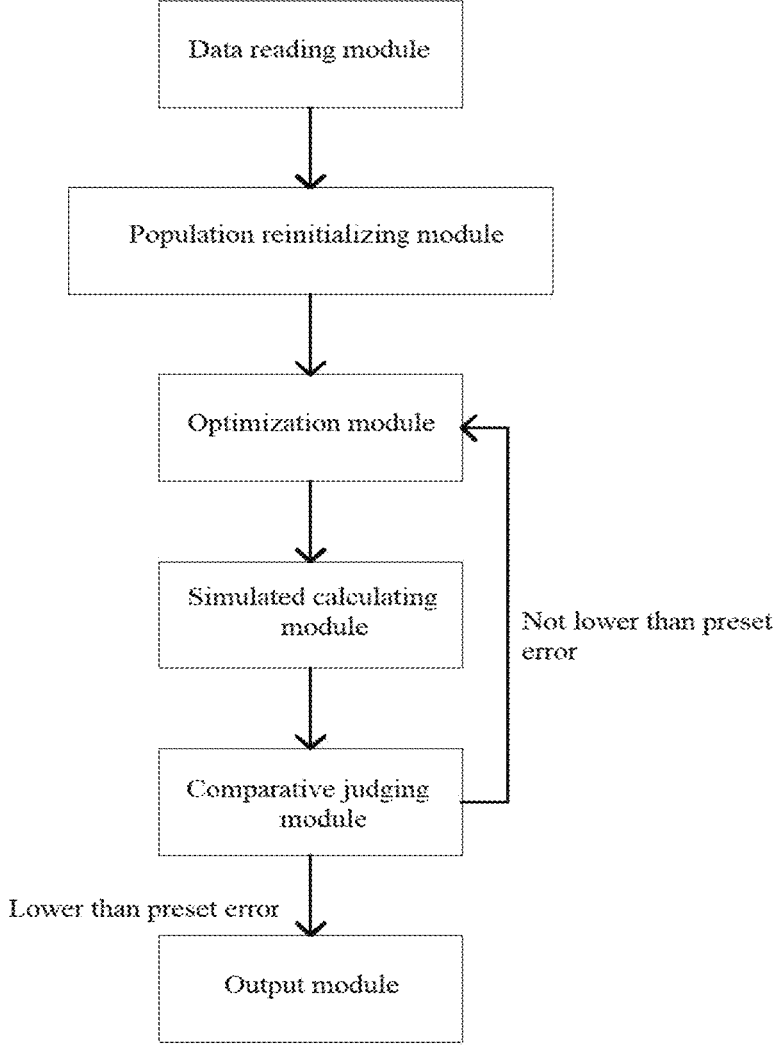
FIG. 1 is a schematic diagram of an automatic history matching system of an oil reservoir based on transfer learning.
Figure 2:
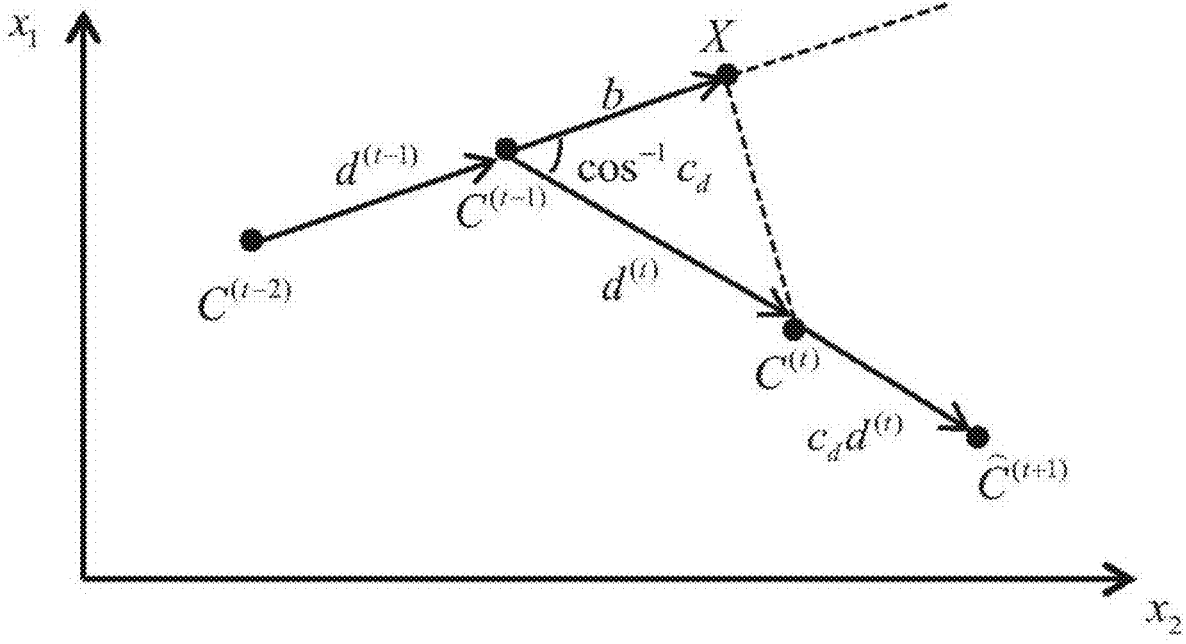
FIG. 2 is a schematic diagram of controlled translation of an optimum solution set.

As shown in FIG. 1, an automatic history matching system for an oil reservoir based on transfer learning comprises a data reading module, a population reinitializing module, an optimization module, a simulated calculation module, a comparative judgment module and an output module.

The data reading module is configured to read oil reservoir observed data at a moment (t+1) and the optimized results of the history matching model at a moment (t−2), a moment (t−1) and a moment t, and output the observed data and optimized results to the population reinitializing module; in the present invention, the optimum static parameter of the history matching model of the oil reservoir at the current moment is the optimized population individual and is also the optimum solution set of the optimized model;

the population reinitializing module is configured to process the optimized result at the moment t by using a reinitializing policy with directivity and random change based on transfer learning at the moment (t+1) to obtain the initial population using experience of adjusting a history matching model in an old optimized example, which is used for the optimization module to optimize the oil reservoir model at the moment (t+1) subsequently;

the optimization module is configured to optimize according to the oil reservoir observed data and the initial population at the moment (t+1) to obtain a static parameter of an oil reservoir model optimized at the current moment and output the static parameter to the subsequent simulated calculation module;

the simulated calculation module is configured to perform numerical simulation calculation on the static parameter to the subsequent simulated calculation module obtained by the optimization module to obtain a simulated production result, i.e., simulated data, and output the simulated production result to the comparative judging module;

the comparative judging module is configured to compare the simulated data with the observed data at the current moment to obtain an error, and judge whether the error is lower than a preset error value; if yes, go to the output module, and if not, go to the optimization module to perform iterative calculation again;

the output module is configured to output the optimized static parameter of the oil reservoir history matching model, i.e., a final optimized result when the error is lower than the preset error value.

The population reinitializing module specifically comprises a controlled translation unit, a directional variation unit and a random variation unit, wherein the controlled translation unit is configured to calculate a translation vector $c_d d^{(t)}$ and translate the optimized result at the moment t, i.e., an optimized population, to obtain a repositioned population individual;

the directive vacation unit is configured to calculate a random vector $N(, \sigma_d^2)$ and perform random variation on all the population individuals processed by the controlled translation unit in a direction of the translation vector; and the random variation unit is configured to calculate an average distance $\overline{d_{pw}}$ between paired solutions and apply random variation to all the population individuals processed by the controlled translation unit and the directional variation unit to form an example initial population at the moment (t+1).

The optimization module specifically comprises a construction unit, an initialization unit, an updating unit, a judging unit and an optimum value output unit, wherein the construction unit is configured to construct a target function (a loss function) of the oil reservoir, the target function being determined according to a specific history matching model construction requirement of the oil reservoir;

the initialization unit is configured to initialize the parameter and set an optimization stopping condition, the parameter at least comprising a number of iterations and a population scale;

the updating unit is configured to update a reference point and a population according to a preset algorithm rule condition;

the judging unit is configured to judge whether the optimization stopping condition is met; if yes, go to the optimum value output unit, and if not, go to the updating unit.

The optimum value output unit is configured to output to the simulated calculation module the optimum target function value and the optimized static parameter of the oil reservoir corresponding to the optimum target function value.

In the whole automatic history matching system for an oil reservoir based on transfer learning, the data reading module reads an optimized result of an existing oil reservoir, outputs the optimized result to the population reinitializing module, obtains an initial population of a new oil reservoir by calculation and outputs the initial population to the optimization module; the optimized result is outputted to the simulated calculation module to obtain oil reservoir production simulated data, and the oil reservoir production simulated data is outputted to the comparative judgment module; when an error between the simulated data and observed data meets the requirement, the optimized result is outputted to the output module, and the system operation is completed; and if the error does not meet the requirement, a simulated result is outputted to the optimization module, and optimized calculation of the optimization module, the simulated calculation module and the comparative judging module is performed again.

An automatic history matching method for an oil reservoir based on transfer learning adopting the automatic history matching system for an oil reservoir based on transfer learning, wherein the method comprises the steps of:

S1, reading observed data and an optimized result of an old model, realized by the data reading module in the automatic history matching system for an oil reservoir based on transfer learning; assuming that the current moment is the moment (t+1), wherein the history matching model used by the oil reservoir at present is a t moment model, and as the oil reservoir at the moment (t+1) changes or the oil reservoir model is added with new data, it is necessary to construct the history matching model for a current situation of the oil reservoir at the moment (t+1); reading the observed data of the oil reservoir at the moment (t+1) and providing preparation to judge whether the optimized result meets the requirement or not; and reading the optimized results of the history matching models at the moment (t−2), the moment (t−1) and the moment t, and constructing the initial population for the optimization process at the moment (t+1) by using its useful information for reference.

S2, performing population reinitializing processing on the optimized result of the old model, realized by the reinitializing module in the automatic history matching system for an oil reservoir based on transfer learning; processing the optimized result of the history matching model of the oil reservoir at the moment t by using a reinitializing policy with directivity and random change based on transfer learning; extracting experience used as reference thereof; and constructing an initial population of a case at the moment (t+1).

S3, performing evolutionary optimization calculation and simulated calculation by using the reinitialized setting an optimized target function that meets a specific requirement of the case at the moment (t+1), specific optimization indexes comprising, for example, oil production, water production and water content, and a formula (1) giving a loss function of the history matching model of a reservoir:

$$\min(M=\Sigma(Q_{obs}-Q_{cal})^2\} \tag{1},$$

where M is an unmatched value, $Q_{obs}$ is true observed data of the oil reservoir, and $Q_{cal}$ is simulated calculation data obtained by the simulated calculation module in the automatic history matching system for an oil reservoir based on transfer learning in the present invention;

by using the population obtained in the S2 as the initial population in the optimization process of the history matching model of the oil reservoir at the moment (t+1), using any one evolutionary optimization algorithm, for example, PSO and NSGA-III to optimize the history matching model of the oil reservoir at the moment (t+1) and adjusting the parameter thereof to obtain the optimized result at the moment (t+1), wherein the evolutionary optimization algorithm is realized by the optimization module in the automatic history matching system for an oil reservoir based on transfer learning; and putting the optimized result into a reservoir numerical simulation for simulated calculation, wherein if an error between the observed data and the simulated data meets the requirement, an effective effect may be outputted, and on the contrary, iterative calculation is performed continuously; and it is realized by adopting the simulated calculation module and the comparative judging module in the automatic history matching system for an oil reservoir based on transfer learning.

Figure 3:
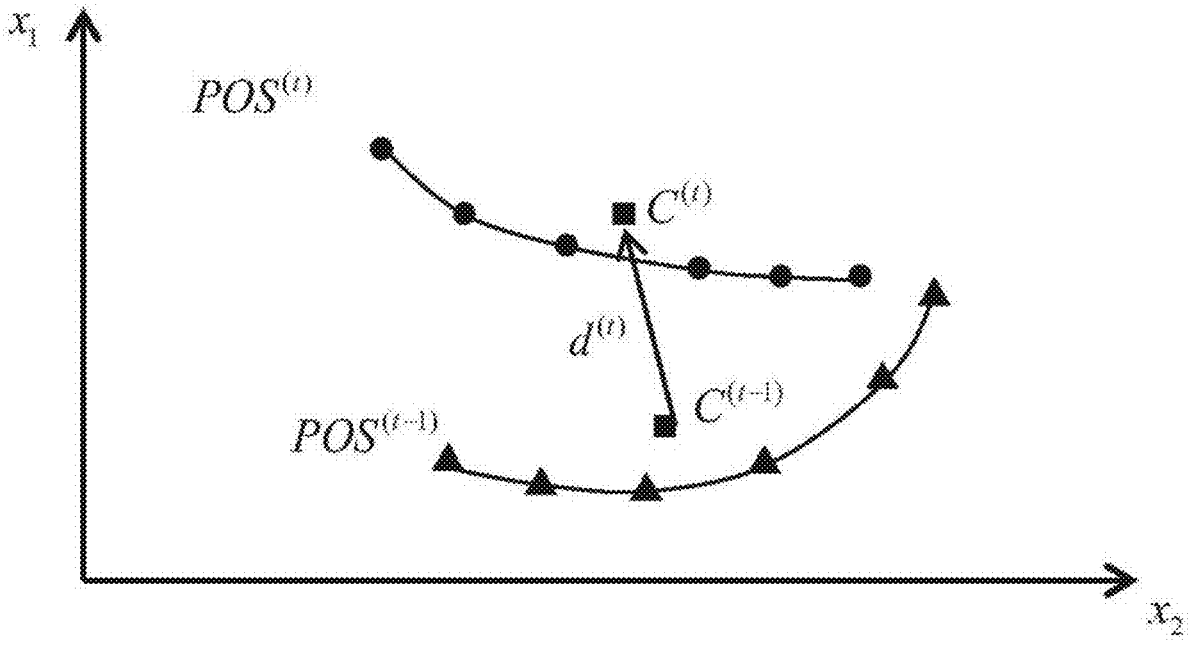
FIG. 3 is a schematic diagram of an optimum solution set at the moments (t−1) and t.
Figure 4:
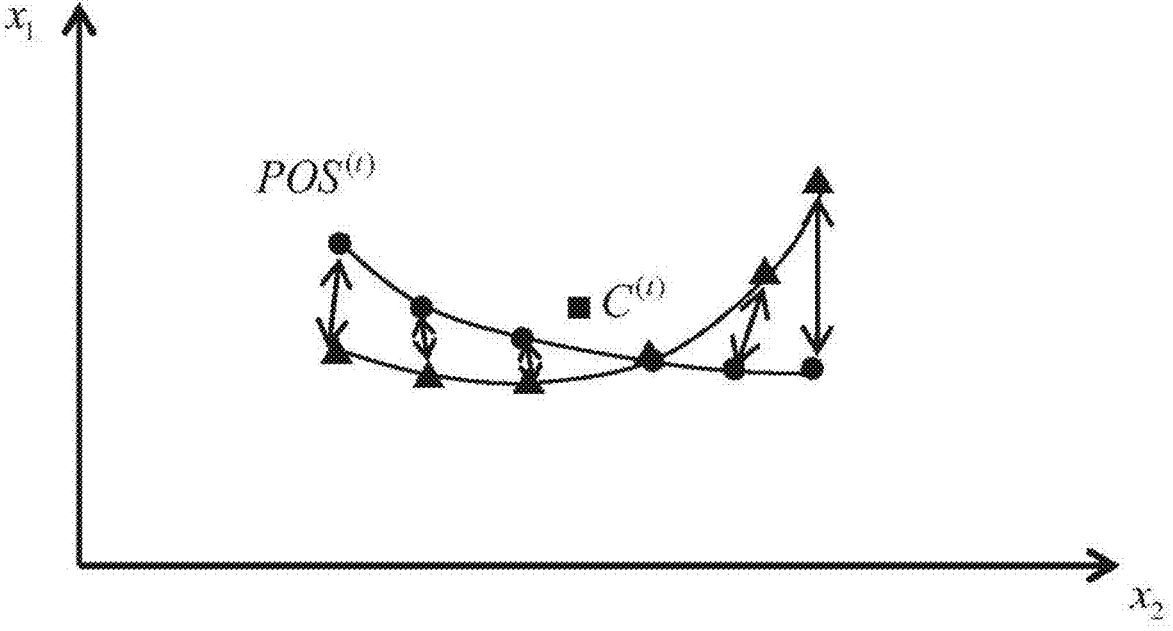
FIG. 4 shows the optimum solution set at the moments (t−1) and t, centroids of which are superposed by translation, and an average distance between paired solutions is calculated.

Further, S2 specifically comprises:

S21, controlled translation calculating centroids of the optimum solution sets at three moments: $C^{(t--2)}$, $C^{(t-1)}$ and $C^{(t)}$ respectively according to optimum solution sets at the moment (t−2), the moment (t−1) and the movement t, making $C^{(t)}-C^{(t-1)}$ to obtain a vector $d^{(t)}$, and making $C^{(t-1)}-C^{(t-2)}$ to obtain a vector $d^{(t-1)}$; making $C^{(t-1)}+d^{(t-1)}$ to obtain a vector b, defining an included angle between b and $d^{(t)}$ as $\cos^{-1} c_d$, and calculating $c_d$ and further calculating a translation vector $c_d d^{(t)}$, wherein all solutions in the optimum solution set at the moment t, i.e., all individuals and translation vectors in the optimized population at the moment t are added to reposition according to amplitude and direction of the translation vectors;

tracking movement of the optimum solution sets at the moment (t−2), the moment (t−1) and the moment t, thereby providing experience of being transferred to the optimum solution set that predicts a new problem at the moment (t+1); first, calculating movement of the optimized population individual at the moment t, wherein as shown in a formula (2), $C^{(t)}$ and $C^{(t−1)}$ are centroids of the population individual at the moment t and the moment (t−1);

$$d_t = C^{(t)} - C^{(t-1)} \qquad (2)$$

a predicted value $C^{(t−1)}$ is a centroid of the population individual in the optimums solution set at the moment (t+1), wherein a calculation method thereof is as shown in a formula (3), $$\hat{C}^{(t+1)} = C^{(t)} + c_d d^{(t)} \qquad (3)$$

$$c_d = \max\left\{ \min\left\{ 1, \frac{d^{(t)} \cdot d^{(t-1)}}{\|d(t)\| \cdot \|d(t-1)\|} \right\}, 0 \right\}$$

where $0 \le c_d \le 1$ represents reliability that $d^{(t)}$ is taken as an evaluated value of $d^{(t+1)}$; as the two are usually different in both amplitude and direction, precise calculation may not be performed on the true $d^{(t+1)}$ in the stage; a predicted vale of $d^{(t−1)}$ to $C^{(t)}$ after moment change is analyzed; it can be seen from the controlled translation schematic diagram that $C^{(t−1)}$ is moved directly with an accurate value close to Co according to direction and amplitude of $d^{(t−1)}$, wherein $C^{(t−1)}$ arrives a wrong point X; therefore, $\|b\| / \|d(^{t−1})\|$ may calculate prediction reliability of $d^{(t−1)}$ to $C^{(t)}$, and the reliability is used to predict translation of $C^{(t)}$ along a direction of $d^{(t)}$ to obtain a distance of $C^{(t+1)}$;

S22, directional variation performing random variation on all the population individuals processed in the S21 in a direction of the translation vector $c_d d^{(t)}$, the change intensity thereof being amplitude of the translation vector multiplied with an independent random number vector $N(1, \sigma_d^2)$ sampled in normal distribution, wherein direction change is adopted as a specific form of random change to improve diversity of population obtained as the population translates along the direction of do, specifically as shown in a formula (4):

$$y_j = x_j^{*(t)} + c_d d^{(t)} \otimes N(1, \sigma_d^2), j = 1, 2, \ldots, N_s \qquad (4)$$

where $y_j$ is a population subject to controlled translation and directive variation, $N(1, \sigma_d^2)$ is an independent random number vector sample in normal distribution, a mean value thereof being 1, and a standard deviation being $\sigma_d$; $N_s$ is a size of population, and $x_j^{*(t)}$ is the $j^{th}$ individual in the old optimum solution set at the moment t; under a default condition, the standard deviation is 1, and if $y_j$ is not in a search space, it is only needed to reposition $y_i$ to the nearest point in the search space; and in the repositioning process, whether each element of $y_j$ falls within the search space is judged, and if not, it is modified to an upper/lower bound value corresponding to the element; and S23, random variation applying completely random variable to all the population individuals processed in S22 to form an initial population of a new example (an example at the moment (t+1), the amplitude of random variation being determined by a mean value $\overline{d_{pw}}$ of a distance between paired solutions at the moment (t−1) and the moment t, wherein each population goes through uniform random change to generate white noise, intensity of which being determined by amplitude of random change; a calculating process is shown in FIG. 3 and FIG. 4: first, converting the optimum solution set $POS^{(t−1)}$ of the example at the moment (t−1) into $C^{(t−1)}$ and moving the same to be superposed with the centroid of $C^{(t)}$; and then finding the nearest corresponding solution in $POS^{(t−1)}$ from a random solution in $POS^{(t)}$, matching two corresponding solutions and shielding the same to prevent from being selected by any other solution in $POS^{(t)}$ till all solutions in the two solution sets are paired, wherein an average distance between all the paired solutions is defined as $\overline{d_{pw}}$, which represents intensity of random variation;

$$\sigma_r = c_r \overline{d_{pw}}$$

$$x_j^{new} \sim N(y_j, \sigma_r^2, L, U), j = 1, 2, \ldots, N_s \qquad (5)$$

where $c_r$ is a self defined value; $x_j^{new}$ is an initial population processed by the reinitializing policy with directivity and random change based on transfer learning at the moment (t+1), used for optimizing the history matching model of the oil reservoir at the moment (t+1), which is generated by using truncated normal distribution, wherein a center thereof is $y_j$, a standard deviation is $\sigma_r$, a lower bound is a lower bound (L) of the search space and an upper bound is an upper bound (U) of the search space.

The method for calculating the initial population of the oil reservoir model at the moment (t+1) specifically comprises:

①	a translation vector is calculated according to a formula (2);

②	$c_d$ is calculated according to a formula (3);

③	$y_j$ is calculated according to a formula (4), and modifying the same according to the method in the S22 if it is not in the search space; and ④	a population reinitializing result is calculated according to a formula (5).

Figure 5A:
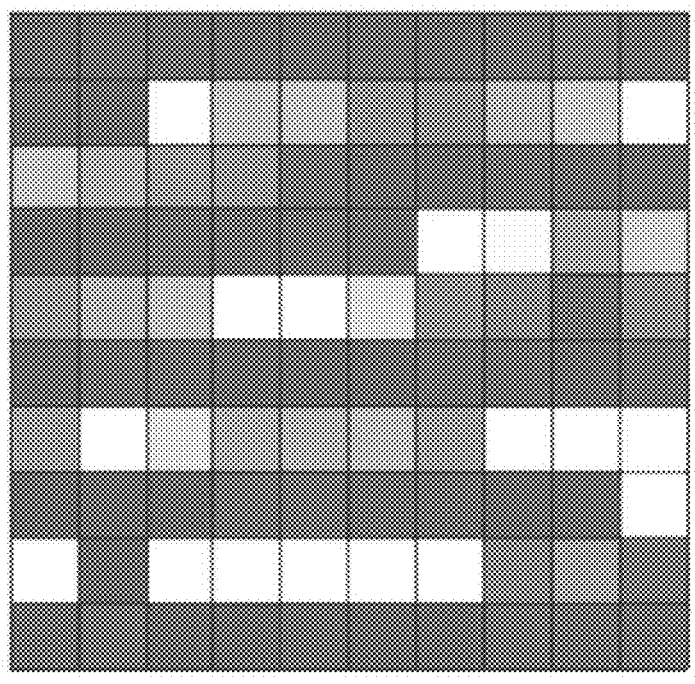
FIG. 5A is a permeability distribution of the first five years (moment t−1) when the time step is five years.
Figure 5B:
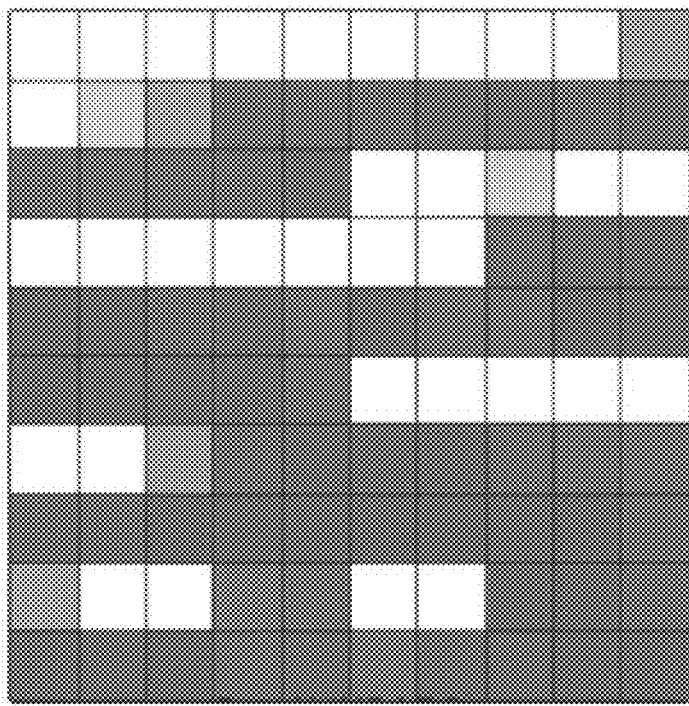
FIG. 5B is permeability distribution of the second five years (moment t).
Figure 6:
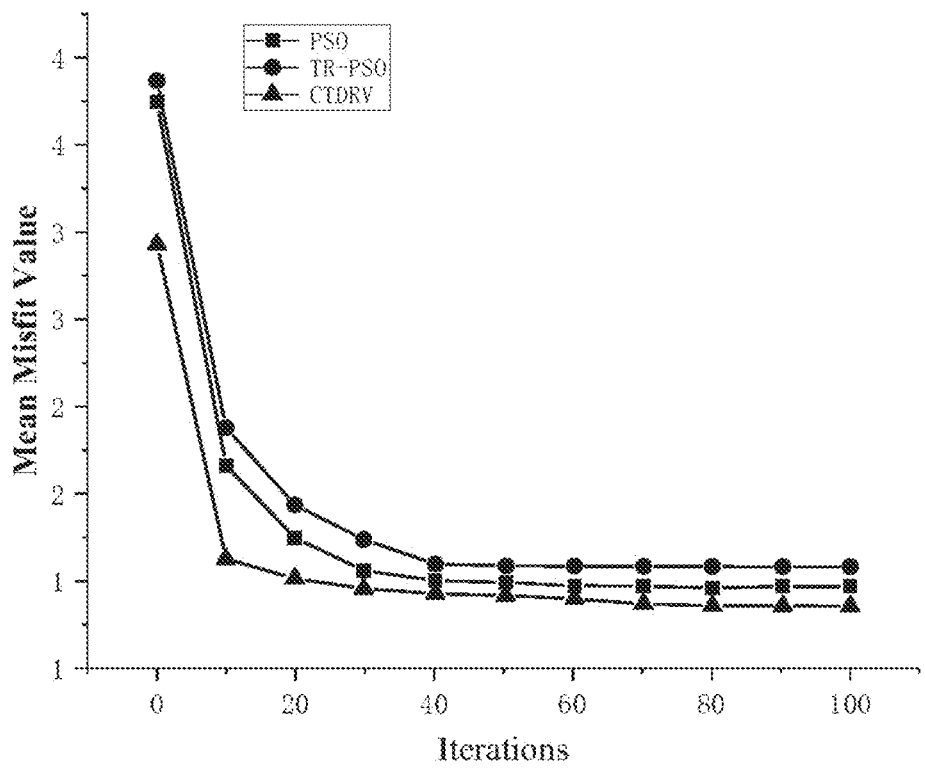
FIG. 6 is a single target history matching calculating error comparison result which respectively adopts an original PSO algorithm, an improved TR-PSO algorithm and a CTDRV algorithm of an automatic history matching method of an oil reservoir based on transfer learning provided by the present invention.
Figure 7:
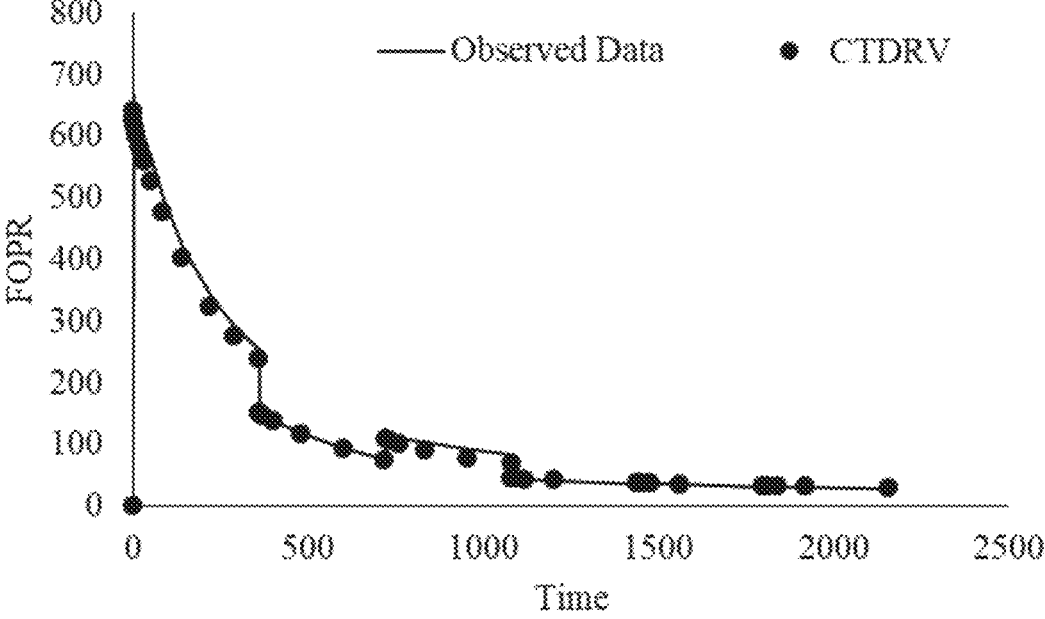
FIG. 7 is comparison between a true observed output of an oil field and a predicted value of the CTDRV algorithm.
Figure 8:
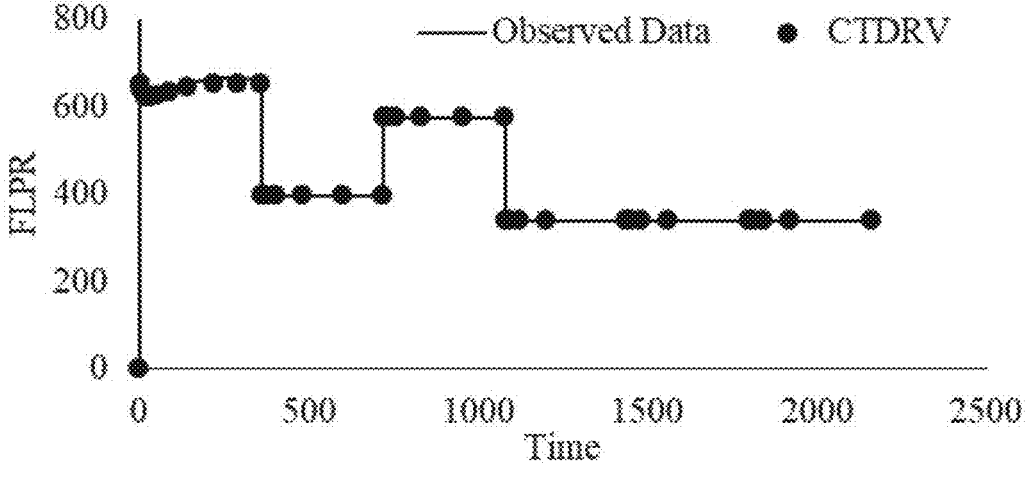
FIG. 8 is comparison between a true observed fluid production rate of an oil field and a predicted value of the CTDRV algorithm.
Figure 9:
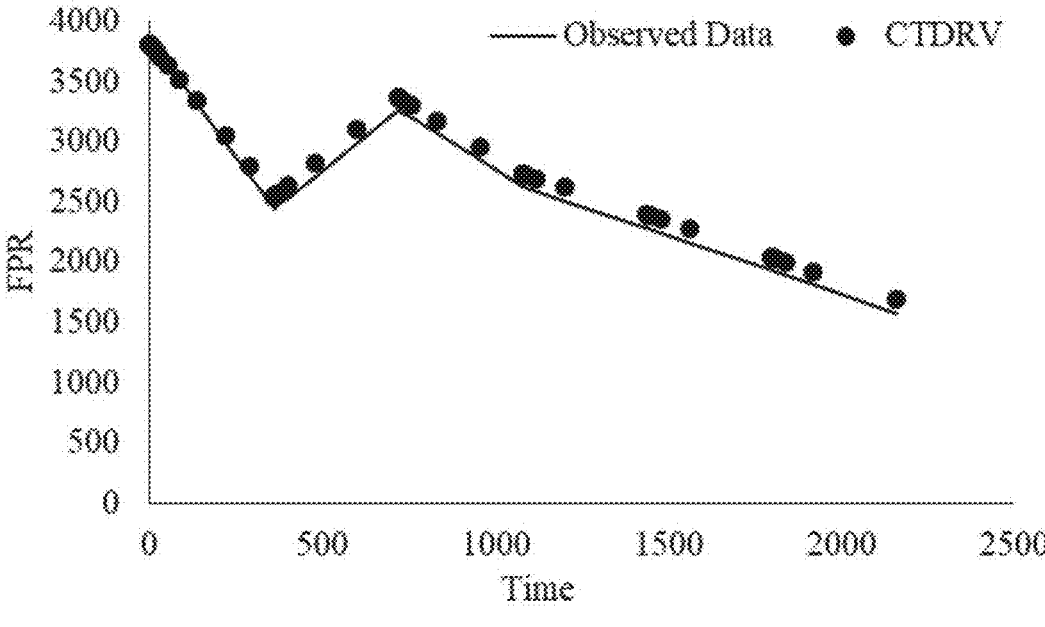
FIG. 9 is comparison between a true observed reservoir pressure of an oil field and a predicted value of the CTDRV algorithm.
Figure 10:
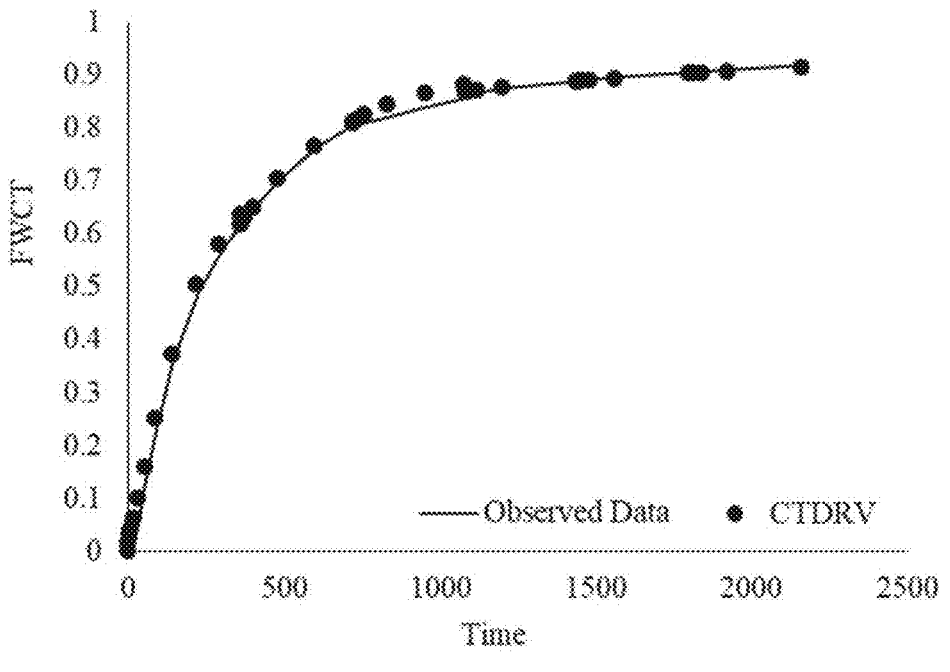
FIG. 10 is comparison between a true water content of an oil field and a predicted value of the CTDRV algorithm.

Embodiment 1 The automatic history matching method for the oil reservoir based on transfer learning is primarily researched and experimented to inspect its effect. An experimental model is a reservoir model set by Eclipse, gridding distribution is 10*10*1, a dimension of a single gridding is 100*100*20 inches, and the model has four production wells and one water injection well distributed in a five point well pattern. The four production wells are respectively located at four corners of the gridding and the water injection well is located at the right center of the gridding. It may be observed that the permeability changes greatly when the time step changes, as shown in FIGS. 5A and 5B. The experimental objective of the model is to test expression of the original PSO algorithm, the improved TR-PSO algorithm and the CTDRV algorithm of an automatic history matching method of an oil reservoir based on transfer learning provided by the present invention on the history matching model of the oil reservoir injection-production process. The total simulation time is 10 years which are divided into two time steps: the moment (t−1) is the first five years and the moment t is the second five years. The simulation result is as shown in FIG. 6. It may be apparently seen that performance of the CTDRV algorithm is superior to that of TR-PSO and PSO algorithms. The calculating efficiency and robustness of the CTDRV algorithm in solving the history matching problems are further proved. It is because of great advantage of the reinitializing policy provided by the present invention compared with other algorithms. The CTDRV algorithm uses the optimized result of the example at the moment (t−1) for reference from the beginning of calculation and tracks movement of the optimum solution set thereof, thereby better conjecturing a trusted region to find the optimum solution set of the example at the moment t.

When four specific objectives: oil production, reservoir pressure, water cut and liquid production are considered, a simulation result is as shown in FIG. 7 to FIG. 10. It may be seen that data such as simulated oil production obtained by numerical simulation from the optimized result calculated by the CTDRV algorithm is nearly the same as true data and it is confirmed that the numerical reservoir simulation model calculated by the CTDRV algorithm is nearly the same as a true model, and it has relatively high credibility and accuracy in predicting future production.

The invention claimed is:

1. An automatic history matching method for an oil reservoir based on transfer learning, adopting an automatic history matching system for an oil reservoir for improving the accuracy of reservoir forecasts in oil engineering, characterized in that the method comprises the steps of:

S1, reading observed data and an optimized result of an old model;

S2, performing population reinitializing processing on the optimized result of the old model to generate a reinitialized population; and S3, performing evolutionary optimization calculation and simulated calculation by using the reinitialized population, predicting oil reservoir dynamically according to oil reservoir numerical simulator; characterized in that S1 comprises the specific steps of: assuming that the current moment is the moment (t+1), wherein the history matching model used by the oil reservoir at present is a t moment model, and as the oil reservoir at the moment (t+1) changes or the oil reservoir model is added with novel data, it is necessary to construct a history matching model for a current situation of the oil reservoir at the moment (t+1); reading the observed data of the oil reservoir at the moment (t+1) and providing preparation to judge whether the optimized result meets the requirement; and reading the optimized results of the history matching models at the moment (t−2), the moment (t−1) and the moment t, and constructing the initial population for the optimization process at the moment (t+1) by using its useful information for reference;

wherein the automatic history matching method is based on transfer learning, obtaining simulated oil production rates and liquid production rates for predicting future production status in oil engineering, for improving the accuracy of reservoir forecasts in oil engineering.

2. The automatic history matching method for an oil reservoir based on transfer learning according to claim 1, characterized in that S2 comprises the specific steps of: processing the optimized result of the history matching model of the oil reservoir at the moment t by using a reinitializing policy with directivity and random change based on transfer learning; extracting experience used as reference thereof; and constructing an initial population of a case at the moment (t+1).

3. The automatic history matching method for an oil reservoir based on transfer learning according to claim 1, characterized in that S3 comprises the specific steps of:

setting an optimized target function that meets a specific requirement of the case at the moment (t+1), specific optimization indexes comprising, for example, oil production, water production and water content, and a formula (1) giving a loss function of the history matching model of a reservoir:

$$\{M = \Sigma(Q\text{obs} - Q\text{cal})2\} \tag{1}$$

where M is an unmatched value, Qobs is true observed data of the oil reservoir, and Qcal is simulated calculation data by using the population obtained in the S2 as the initial population in the optimization process of the history matching model of the oil reservoir at the moment (t+1), using PSO or NSGA-III evolutionary optimization algorithm to optimize the history matching model of the oil reservoir at the moment (t+1) and adjusting the parameter thereof to obtain the optimized result at the moment (t+1); and putting the optimized result into a reservoir numerical simulation for simulated calculation, wherein if an error between the observed data and the simulated data meets the requirement, an effective effect may be outputted, and on the contrary, iterative calculation is performed continuously.

4. The automatic history matching method for an oil reservoir based on transfer learning according to claim 1, characterized in that S2 specifically comprises: S21, controlled translation calculating centroids of the optimum solution sets at three moments: C(t−2), C(t−1) and C(t) respectively according to optimum solution sets at the moment (t−2), the moment (t−1) and the movement t, making C(t)−C(t−1) to obtain a vector d(t), and making C(t−1)−C(t−2) to obtain a vector d(t−1); making C(t−1)+d(t+1) to obtain a vector b, defining an included angle between b and d(t) as cos−1cd, and calculating cd and further calculating a translation vector cdd(t), wherein all solutions in the optimum solution set at the moment t, i.e., all individuals and translation vectors in the optimized population at the moment t are added to reposition according to amplitude and direction of the translation vectors;

tracking movement of the optimum solution sets at the moment (t−2), the moment (t−1) and the moment t, thereby providing experience of being transferred to the optimum solution set that predicts a new problem at the moment (t+1); first, calculating movement of the optimized population individual at the moment t, wherein as shown in a formula (2), C(t) and C(t−1) are centroids of the population individual at the moment t and the moment (t−1);

$$dt = C(t) - C(t-1) \tag{2}$$

a predicted value C(t+1) is a centroid of the population individual in the optimums solution set at the moment (t+1), wherein a calculation method thereof is as shown in a formula (3), $$\hat{C}^{(t+1)} = C^{(t)} + c_d d^{(t)} \tag{3}$$

$$c_d = \max\left\{\min\left\{1, \frac{d^{(t)}.d^{(t-1)}}{\|d(t)\|.\|d(t-1)\|}\right\}, 0\right\}$$

where $0 \leq cd \leq 1$ represents reliability that d(t) is taken as an evaluated value of d(t+1); as the two are usually different in both amplitude and direction, precise calculation may not be performed on the true d(t+1)

in the stage; analyzing a predicted vale of $d(t-1)$ to $C(t)$ after moment change; moving $C(t-1)$ directly with an accurate value close to $C(t)$ according to direction and amplitude of $d(t-1)$, wherein $C(t-1)$ arrives a wrong point X; therefore, $\|b\|/\|d(t-1)\|$ may calculate prediction reliability of $d(t-1)$ to $C(t)$, and the reliability is used to predict translation of $C(t)$ along a direction of $d(t)$ to obtain a distance of $C(t+1)$;

S22, directional variation performing random variation on all the population individuals processed in the S21 in a direction of the translation vector $cdd(t)$, the change intensity thereof being amplitude of the translation vector multiplied with an independent random number vector $N(1, \sigma d2)$ sampled in normal distribution, wherein direction change is adopted as a specific form of random change to improve diversity of population obtained as the population translates along the direction of $d(t)$, specifically as shown in a formula (4):

$$yj=xj^*(t)+cdd(t)\otimes N(1,\sigma d2), j=1,2, \ldots ,Ns \qquad (4)$$

where yj is a population subject to controlled translation and directional variation, $N(1, \sigma d2)$ is an independent random number vector sample in normal distribution, a mean value thereof being 1, and a standard deviation being od; Ns is a size of population, and $xj^*(t)$ is the jth individual in the old optimum solution set at the moment t; under a default condition, the standard deviation is 1, and if yj is not in a search space, it is only needed to reposition yi to the nearest point in the search space; and in the repositioning process, whether each element of yj falls within the search space is judged, and if not, it is modified to an upper/lower bound value corresponding to the element; and S23, random variation applying completely random variable to all the population individuals processed in S22 to form an initial population of a new example (an example at the moment (t+1), the amplitude of random variation being determined by a mean value dpw of a distance between paired solutions at the moment (t−1) and the moment t, wherein each population goes through uniform random change to generate white noise, intensity of which being determined by amplitude of random change; first, converting the optimum solution set POS(t−1) of the example at the moment (t−1) into $C(t-1)$ and moving the same to be superposed with the centroid of $C(t)$; and then finding the nearest corresponding solution in POS (t−1) from a random solution in POS(t−1), matching two corresponding solutions and shielding the same to prevent from being selected by any other solution in POS(t) till all solutions in the two solution sets are paired, wherein an average distance between all the paired solutions is defined as dpw, which represents intensity of random variation;

$$\sigma r=crdpw$$

$$xjnew^\sim N(yj,\sigma r2,L,U),j=1,2, \ldots ,Ns \qquad (5)$$

where cr is a self defined value, xjnew is an initial population processed by the reinitializing policy with directivity and random change based on transfer learning at the moment (t+1), used for optimizing the history matching model of the oil reservoir at the moment (t+1), which is generated by using truncated normal distribution, wherein a center thereof is yj, a standard deviation is or, a lower bound is a lower bound (L) of the search space and an upper bound is an upper bound (U) of the search space.

5. The automatic history matching method for an oil reservoir based on transfer learning according to claim 4, characterized in that: the method for calculating the initial population of the oil reservoir model at the moment (t+1) comprises the specific steps of:

calculating a translation vector according to a formula (2);

calculating cd according to a formula (3);

calculating yj according to a formula (4), and modifying the same according to the method in the S22 if it is not in the search space; and calculating a population reinitializing result according to a formula (5).

\* \* \* \* \*